United States Patent
Mason (10) Patent No.: US 11,566,721 B2
(45) Date of Patent: Jan. 31, 2023

(54) DIELECTRIC UNION BALL VALVE

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 17/117,562

(22) Filed: Dec. 10, 2020

(65) Prior Publication Data
US 2022/0186854 A1    Jun. 16, 2022

(51) Int. Cl.
| | | |
|---|---|---|
| *F16K 27/06* | (2006.01) | |
| *F16K 5/06* | (2006.01) | |
| *F16K 11/087* | (2006.01) | |
| *F16L 15/04* | (2006.01) | |
| *F16K 31/60* | (2006.01) | |

(52) U.S. Cl.
CPC .............. *F16K 27/067* (2013.01); *F16K 5/06* (2013.01); *F16K 11/0873* (2013.01); *F16K 31/60* (2013.01); *F16L 15/04* (2013.01)

(58) Field of Classification Search
CPC .......... F16K 27/067; F16K 5/06; F16K 31/60; F16K 11/0873; F16L 15/04; F16L 25/0072
See application file for complete search history.

(56) References Cited

U.S. PATENT DOCUMENTS

| | | | |
|---|---|---|---|
| 3,355,191 A | 11/1967 | Tzschirntsch | |
| 5,201,493 A * | 4/1993 | Kim ....................... | F16K 5/0642 137/560 |
| 7,604,217 B2 * | 10/2009 | Lum ..................... | F16K 5/0626 251/148 |
| 7,631,662 B2 * | 12/2009 | Reck ..................... | F16K 5/0605 137/625.47 |
| 8,375,991 B2 * | 2/2013 | Erhardt ................... | F24H 9/122 137/625.47 |
| 10,208,875 B1 | 2/2019 | Zitting | |
| 10,364,906 B1 | 7/2019 | Cassidy | |
| 2006/0099843 A1 | 5/2006 | Fullner et al. | |
| 2011/0074149 A1 | 3/2011 | Matsui et al. | |
| 2013/0187075 A1 | 7/2013 | Craig | |

OTHER PUBLICATIONS

Taranton, "Dielectric Fittings and Underground Tank Installations," https://www.tarantin.com (2020).

* cited by examiner

*Primary Examiner* — Michael R Reid
(74) *Attorney, Agent, or Firm* — Price Heneveld LLP (57) ABSTRACT

A dielectric union ball valve utilizes a non-conductive separation sleeve to prevent contact between the union and the nut of a dielectric valve assembly. The valve assembly can optionally include an independently operated drain valve port to permit draining of the valve assembly. The use and positioning of a non-conductive separation sleeve mitigates potential galvanic reaction between dissimilar pipes and/or fittings that are connected to the valve assembly.

20 Claims, 5 Drawing Sheets

DIELECTRIC UNION BALL VALVE

BACKGROUND OF THE INVENTION

The present invention relates to a dielectric union ball valve. Metal piping can carry a potential electrical current, particularly when components with different types of metal are coupled together. Galvanic corrosion can damage pipes, fittings, appliances, etc., ultimately leading to potential leaks and/or other damage. Dielectric unions can be used to mitigate the potential risk of galvanic corrosion due to an electrolytic reaction in a plumbing and/or hydronic heating system when two dissimilar metals, such as copper and iron, are in the system's piping.

Non-conductive material can be used between the connections of dissimilar materials to mitigate electrolysis. However, in order to install a valve or a drain, multiple components are needed to be correctly installed together in order to ensure the proper placement of non-conductive material and to prevent leaking.

An improved dielectric union ball valve assembly that eliminates a number of potential leak paths while ensuring the proper placement of non-conductive material, while saving assembly time, labor, and space, is described herein.

SUMMARY OF THE INVENTION

One aspect of the present invention is a valve assembly having a fluid passageway between a fitting end and a union end of a valve body. The valve body has a drain path between the fluid passageway and the drain port. A valve member is located at the intersection of the fluid passageway and the drain path in the valve body. The valve member opens the fluid passageway between the fitting end and the union end of the valve body, while closing the fluid passageway from the drain path when the valve member is in a first position. The valve member closes the fluid passageway between the fitting end and the union end of the valve body, while opening the fluid passageway from the fitting end to the drain path when the valve member is in the second position. The valve member closes the fluid passageway between the fitting end and the union end of the valve body, while opening the fluid passageway from the union end to the drain path when the valve member is in the third position. The valve assembly includes a union with an external shoulder that is made from a first metallic material. The valve assembly includes a nut that is coupled to the union end of the valve body. The nut is made from a second metallic material that is different from the first metallic material. The nut includes an internal shoulder. The valve assembly includes a sealing member positioned between the union and the union end of the valve body. The valve assembly also includes a non-conductive separation sleeve that is positioned to prevent contact between the union and the nut.

Yet another aspect of the present invention is a valve assembly that includes a valve body having a fluid passageway between a fitting end and a union end of the valve body. The valve assembly includes a valve member located in the fluid passageway between the fitting end and the union end of the valve body, configured to open and close the fluid passageway. The valve assembly includes a union made from a first metallic material. The union has a generally cylindrical outer surface and an external shoulder. The valve assembly includes a nut that is coupled to the union end of the valve body. The nut is made from a second metallic material that is different from the first metallic material. The nut has an internal shoulder. The valve assembly includes a sealing member positioned between the union and the union end of the valve body. The valve assembly also includes a non-conductive separation sleeve. The non-conductive separation sleeve has a first generally cylindrical portion with a first diameter and a second generally cylindrical portion with a second diameter that is larger than the first diameter. The non-conductive separation sleeve includes an external shoulder and an internal shoulder. The non-conductive separation sleeve is positioned between portions of the nut and the union preventing contact between surfaces of the nut and the union.

Yet another aspect of the present invention is a piping system with a dielectric valve. The dielectric valve includes a unitary valve body having a fluid passageway between a fitting end and union end of the valve body. A valve member is located in the fluid passageway. The dielectric valve includes a union made from a first metallic material. A nut, made from a second metallic material that is different from the first metallic material, is coupled to the union end of the valve body. A sealing member is positioned between the union and the union end of the valve body. A non-conductive separation sleeve is positioned in between the nut and the union, preventing contact between the nut and the union. The non-conductive separation sleeve includes an upper section and a lower section that are connected by a generally perpendicular section. The piping system includes a pipe that is coupled to the fitting end and a pipe that is coupled to the union.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in FIGS. 1-6. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

Figure 1:
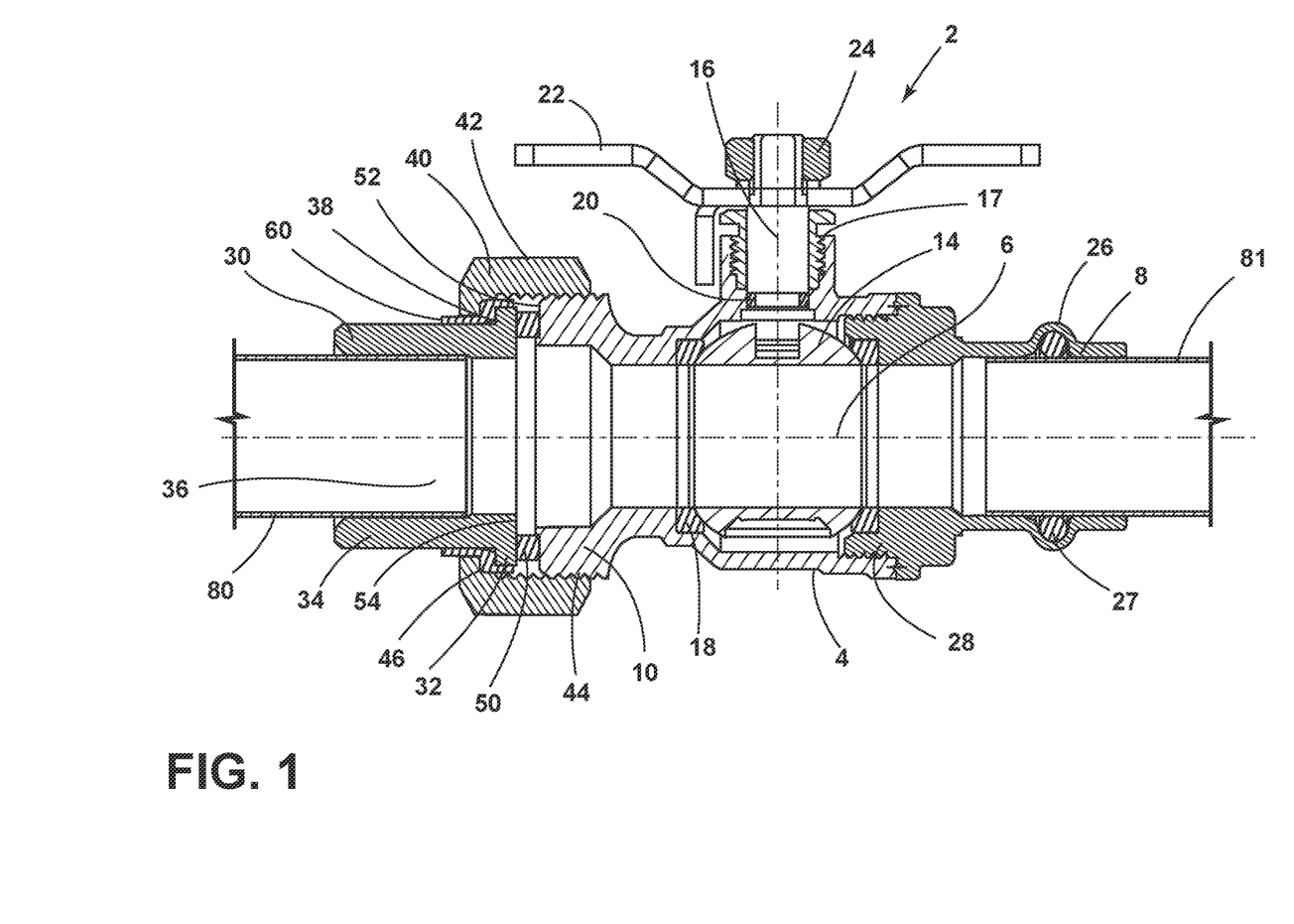
FIG. 1 is a cross-sectional view of one embodiment of a dielectric union ball valve.
Figure 2:
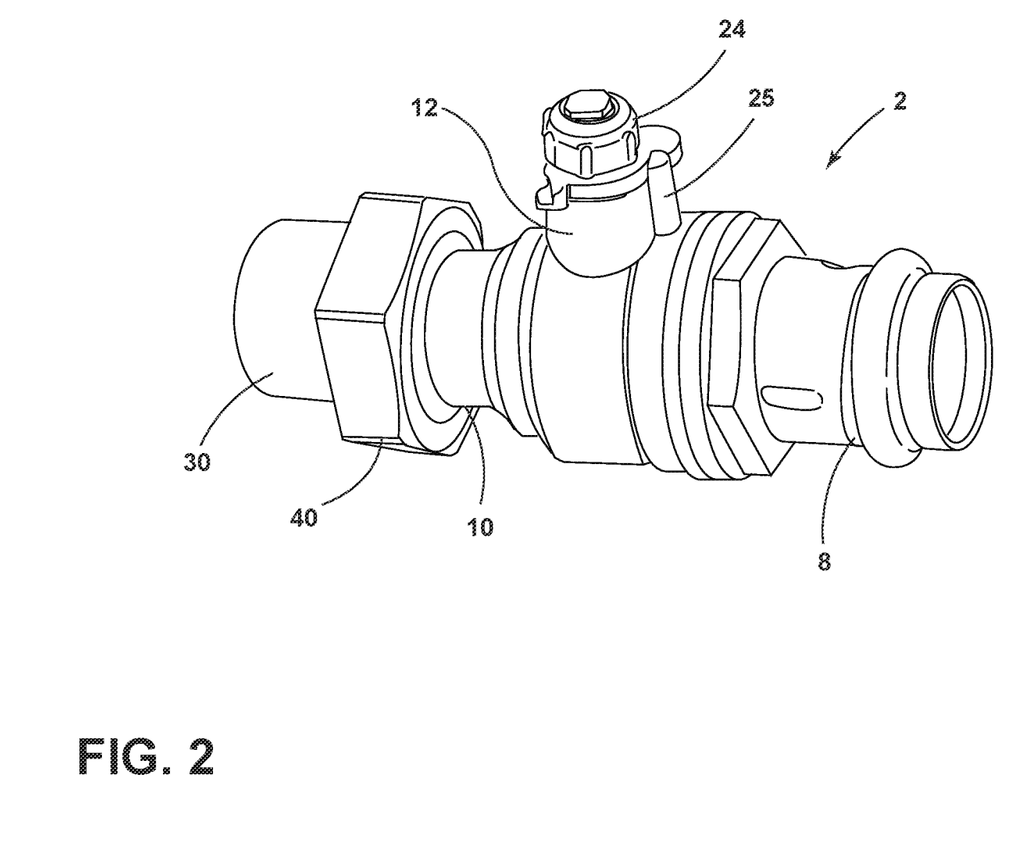
FIG. 2 is a side perspective view of the dielectric union ball valve shown in FIG. 1 without a handle.

By way of overview, the present invention is generally directed to a dielectric union ball valve assembly 2, as illustrated in FIGS. 1 and 2. The valve assembly 2 includes a valve body 4 with a fluid passageway 6 located between the fitting end 8 and a union end 10. In the illustrated embodiment of FIG. 1, the fitting end 8 is a press-fit union that includes an O-ring 27 that is received in O-ring channel 26 in fitting end 8. The fitting end 8 can be any type of fitting end, including, but not limited to, female pipe thread, male pipe thread, traditional solder, PEX, fusion outlet, press-to-connect, push-to-connect, etc.

Figure 4:
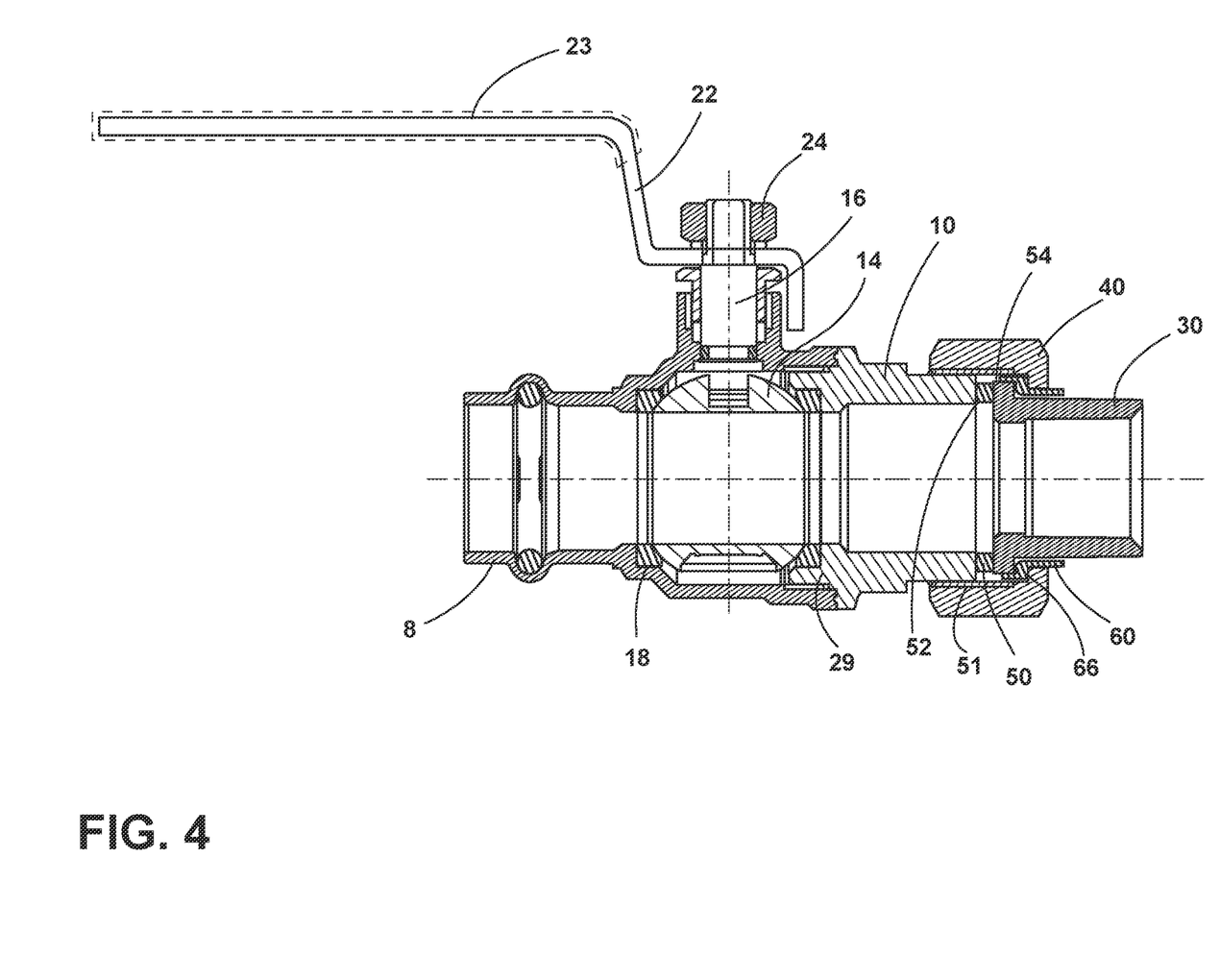
FIG. 4 is a side cross-sectional view of the dielectric union ball valve shown in FIG. 3.

The fitting end 8 can be integrally formed as part of the valve body 4, as shown in FIG. 4, or can be a separate piece that is coupled to the valve body 4, as illustrated in FIG. 1, by coupling the bonnet 28 to valve body 4. In the embodiment illustrated in FIG. 1, the coupling between bonnet 28 and fitting end 8 of the valve body 4 is done by a threaded connection. However, other types of coupling can be done between the bonnet 28 and the valve body 4 if the fitting end 8 is not integrally formed as part of the valve body 4. A pipe 81 can be coupled to fitting end 8, as shown in FIG. 1.

Union end 10 can be integrally formed as part of valve body 4, as illustrated in FIG. 1, or can be part of a separate bonnet 29, as illustrated in FIG. 4. If the union end 10 is a separate bonnet 29, it can be coupled to the valve body 4 by a compression coupling, threading, or any other type of coupling. Union end 10 includes a threaded portion 44 and an end surface 52.

The valve assembly 2 includes a union 30. The union 30 has a first portion 32 and a second portion 34. The outside diameter of the first portion 32 is larger than the outside diameter of the second portion 34 thereby creating an external shoulder 38 on union 30. The union 30 includes an open end 36 that can be coupled to a pipe 80, as shown in FIG. 1. The union 30 is made of a first metallic material. In the illustrated embodiment, the union 30 is made of a material that includes steel. The union 30 can also be made from different materials and/or include surface treatments/coatings to potentially mitigate electrolysis.

The valve assembly 2 includes a nut 40 that is coupled to the union end 10 of the valve body 4. The nut 40 includes a threaded portion 42 that couples to the threaded portion 44 on union end 10. However, the nut 40 can be coupled to the union end 10 using coupling mechanisms that are supplemental to or in place of the threading. The nut 40 includes an internal shoulder 46. The nut is made from a second metallic material that is different than the material used in the union 30. In the illustrated embodiment, the nut 40 is made from a material that includes brass. Other materials and/or surface treatments/coatings can be used on nut 40.

A sealing member 50 is positioned between the end surface 54 of the union 30 and the end surface 52 of the union end 10, as illustrated in FIG. 1. The sealing member 50 can be compressed so as to prevent a leak path between the valve body 4 and the union 30. The sealing member 50 can be compressed as the nut 40 is coupled to the union end 10. The sealing member 50 can be made from any compressible material. In the illustrated embodiment, the sealing member 50 is a polymeric washer.

Figure 5:
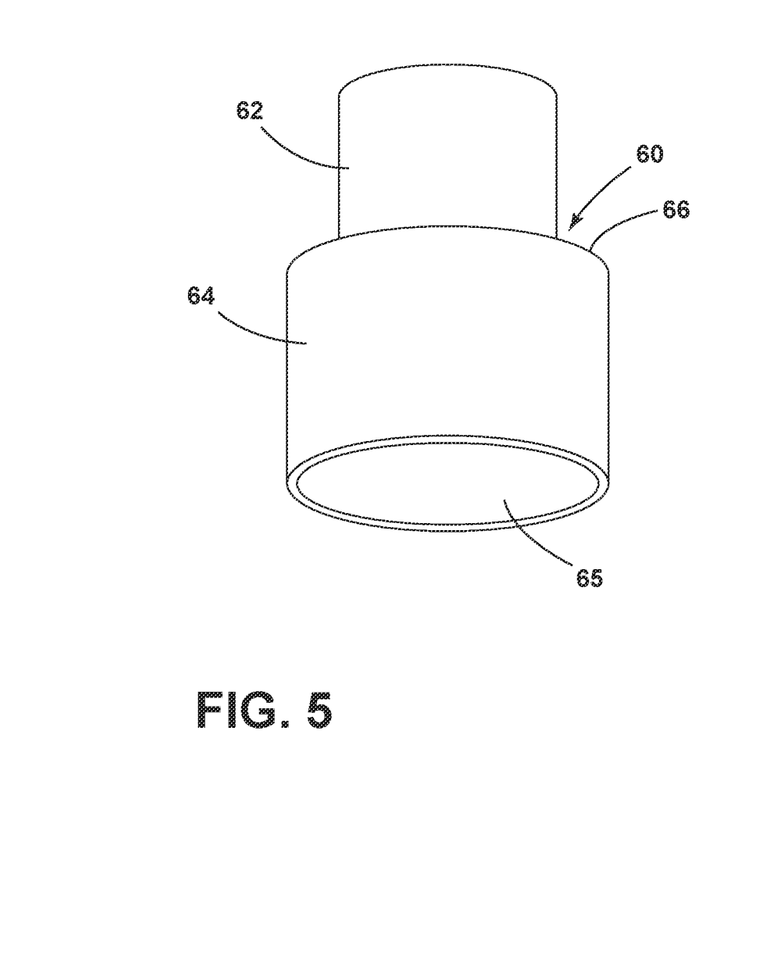
FIG. 5 is a front bottom perspective view of a separation sleeve utilized in the dielectric union ball valves shown in FIGS. 1-4.
Figure 6:
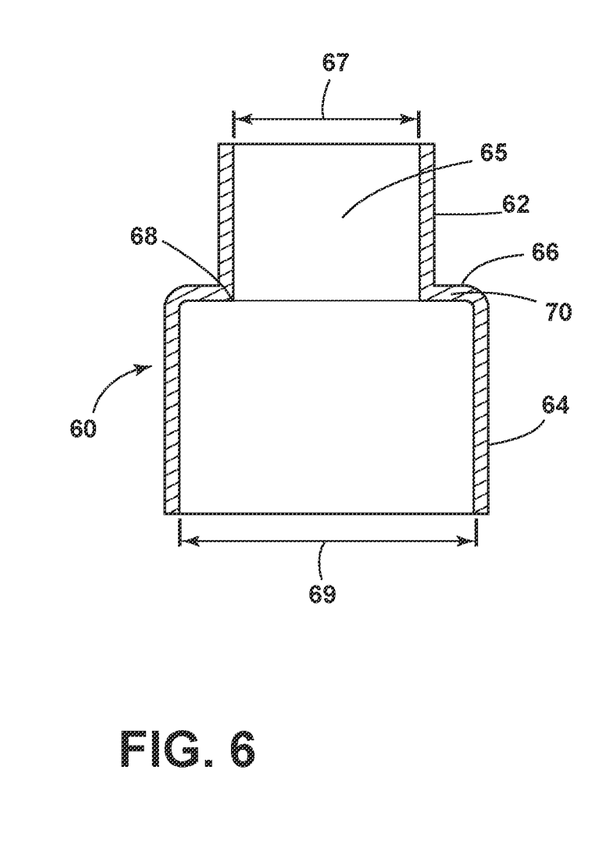
FIG. 6 is a cross-sectional view of the separation sleeve shown in FIG. 5.

A separation sleeve 60 is positioned between the nut 40 and the union 30. Separation sleeve 60 includes a first generally cylindrical portion 62 and a second generally cylindrical portion 64, as illustrated in FIG. 5. The second generally cylindrical portion 64 has a larger diameter 69 than the diameter 67 of the first generally cylindrical portion 62 thereby creating an external shoulder 66 and an internal shoulder 68 on the perpendicular section 70 that connects the first generally cylindrical portion 62 and the second general cylindrical portion 64, as illustrated in FIGS. 5 and 6. The separation sleeve 60 has an opening 65 defined by the diameters 67, 69. The separation sleeve 60 is made of a non-conductive material. In the illustrated embodiment, the separation sleeve is made from a thermoplastic material, such as a nylon polyamide. An example of a nylon polyamide that can be used is PA66 GF-30, which is a glass fiber reinforced polyamide resin. Other types of non-conductive materials can be used provided that they create a seal between and prevent contact of the nut 40 and union 30.

The valve assembly 2 includes a valve member 12 that is positioned in the fluid passageway 6. The valve member 12 includes a ball 14 that is connected to a stem 16. The stem 16 can be connected to a handle 22 by nut 24. Handle 22 can include a sleeve or coating 23. Seals 18 are located around between the ball 14 and the valve body 4, and the stem 16 can include one or more stem seals 20 that prevent leakage between the stem 16 and the stem opening 17 in valve body 4.

In the embodiment illustrated in FIGS. 1 and 2, the ball 14 is able to rotate 90 degrees given to stops 25 formed on valve body 4. The ball 14, therefore, can open and close the fluid passageway 6 between the fitting end 8 and the union end 10.

Figure 3:
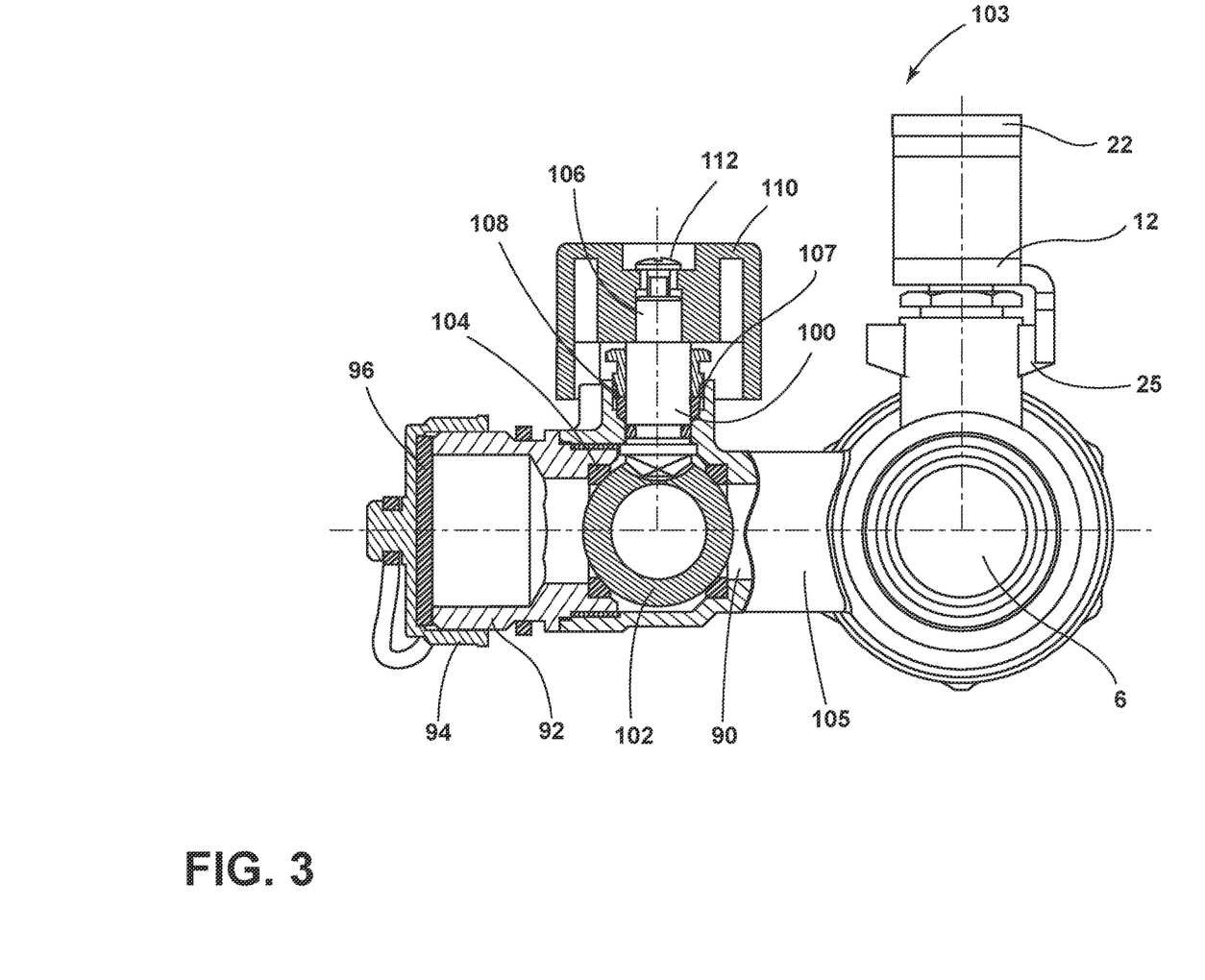
FIG. 3 is a partial, cross-sectional side view illustrating another embodiment of a dielectric union ball valve with a drain port.

An alternative valve assembly 103 includes a drain port 92, as illustrated in FIG. 3. The drain path 90 connects to fluid passageway 6, as illustrated in FIG. 3. The drain port 92 can be covered with a cap 94 and a seal 96 can be positioned between the cap 94 and the drain port 92, as illustrated in FIG. 3. A drain valve member 100 can be used to open and close the drain path 90 between the valve member 12 and the drain port 92. The drain valve member 100 includes a ball 102 with seals 104 between the ball 102 and the valve body 105. The drain valve member 100 includes a stem 106 that is connected to handle 110 by fastener 112. One or more stem seals 108 can be positioned between the stem 106 and the valve body 105 in the drain valve opening 107 in the valve body 105 to prevent leakage. In the embodiment illustrated in FIG. 3, the drain valve member 100 can be rotated 90 degrees in order to open or close the drain path 90 to permit the draining of the valve assembly 103.

The valve member 12 shown in FIGS. 1 and 2 has two positions. The first position is one in which the opening in ball 14 is aligned with the fluid passageway 6 to permit flow between the fitting end 8 and union end 10. The second position is one where the ball 14 blocks the fluid passageway 6 between fitting end 8 and union end 10. The valve member 12 can alternatively be a three-way valve member, such as a T-ball valve. When the valve member 12 is a three-way valve, the valve member 12 has three different positions. In the first position, the valve member 12 opens the fluid passageway 6 between the fitting end 8 and the union end 10 of the valve body 4, while closing the fluid passageway 6 from the drain path 90. When the valve member 12 is in the second position, the fluid passageway 6 between the fitting end 8 and the union end 10 of the valve body 4 is closed. However, the fluid passageway 6 from the fitting end 8 to the drain path 90 is opened. This permits the draining of the valve assembly 2 from the fitting end 8 through drain port 92. When the valve member 12 is in the third position, the fluid passageway 6 between the fitting end 8 and the union end 10 is closed, while the fluid passageway 6 is opened from the union end 10 to the drain path 90. This permits the draining of the valve assembly 2 from the union end 10 through drain port 92. When a three-way valve is utilized for valve member 12, the drain valve member 100 is optional.

In the illustrated embodiments, the valve body 4 and the nut 40 are made from similar metallic material. For example, the valve body 4 and the nut 40 can be made from a material that includes brass. The material can include surface treatments/coatings. The material used on the valve body 4 can be different from the material used in the union 30.

The positioning of the separation sleeve 60, as illustrated in FIGS. 1-4, prevents contact between the dissimilar metals utilized in the nut 40 and the union 30. The similarity of the metals used in nut 40 and valve body 4 does not require a non-conductive material to be placed in between the nut 40 and the valve body 4. However, if valve body 4 and nut 40 are made from dissimilar metals, a non-conductive material 51 can be placed in between the coupling of the nut 40 and the valve body 4 to mitigate galvanic action between the nut 40 and the valve body 4.

The pipe 80 that is connected to union 30 can be made from a similar material as that used in union 30, or a material that is not likely to cause electrolysis at the connection of pipe 80 and union 30. The connection of the pipe 80 to union 30 can be done through a compression coupling, soldering, threading, adhesive, press-fit, or other type of fitting.

The pipe 81 that is coupled to fitting end 8 can be made from a similar material as used in valve body 4 or a material that is not likely to cause significant electrolysis at the coupling of the pipe 81 and the fitting end 8.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention claimed is:

1. A valve assembly, comprising:
a valve body having a fluid passageway between a fitting end and a union end of the valve body;
a drain path in said valve body between said fluid passageway and a drain port;
a valve member located at the intersection of said fluid passageway and said drain path in said valve body;
wherein said valve member opens said fluid passageway between said fitting end and said union end of the valve body while closing said fluid passageway from said drain path when said valve member is in a first position;
wherein said valve member closes said fluid passageway between said fitting end and said union end of the valve body while opening said fluid passageway from said fitting end to said drain path when said valve member is in a second position;

wherein said valve member closes said fluid passageway between said fitting end and said union end of the valve body while opening said fluid passageway from said union end to said drain path when said valve member is in a third position;

a union, with an innermost end and an outermost end, having an external shoulder made from a first metallic material;

a nut coupled to said union end of said valve body, said nut made from a second metallic material that is different than said first metallic material having an internal shoulder;

a sealing member positioned between said union and said union end of said valve body;

a non-conductive separation sleeve, having an innermost end and an outermost end, positioned to prevent contact between said union and said nut, wherein said non-conductive separation sleeve has an outermost section defined by a first generally cylindrical section having a first diameter and an innermost section defined by a second generally cylindrical section having a second diameter that is larger than said first diameter, forming a single shoulder on the exterior surface of said non-conductive separation sleeve and a single shoulder on the interior surface of said non-conductive separation sleeve;

wherein the innermost end of said non-conductive separation sleeve does not extend to the innermost end of said union;

wherein said non-conductive separation sleeve does not contact said sealing member; and a non-conductive material positioned between said nut and said non-conductive separation sleeve.

2. The valve assembly of claim 1, wherein said valve body and said nut are made from the same second metallic material.

3. The valve assembly of claim 1, wherein said second metallic material includes brass.

4. The valve assembly of claim 1, wherein said first metallic material includes steel.

5. The valve assembly of claim 1, wherein said valve member is a T-ball valve.

6. The valve assembly of claim 1, wherein said drain port includes a removable cap.

7. The valve assembly of claim 1, wherein said valve body is a unitary piece.

8. The valve assembly of claim 1, wherein said non-conductive separation sleeve includes a first generally cylindrical portion with a first diameter, a second generally cylindrical portion with a larger second diameter, an external shoulder, and an internal shoulder.

9. A valve assembly, comprising:
a valve body having a fluid passageway between a fitting end and a union end of the valve body;
a valve member located in said fluid passageway between said fitting end and said union end of said valve body, configured to open and close said fluid passageway;
a union, with an innermost end and an outermost end, made from a first metallic material, said union having a generally cylindrical outer surface and an external shoulder;
a nut coupled to said union end of said valve body, said nut made from a second metallic material, different from said first metallic material, said nut having an internal shoulder;
a sealing member positioned between said union and said union end of said valve body;
a non-conductive separation sleeve, having an innermost end and an outermost end, is positioned between portions of said nut and said union preventing contact between surfaces of said nut and said union, wherein said non-conductive separation sleeve has an outermost section defined by a first generally cylindrical section having a first diameter and a second generally cylindrical section having an innermost section defined by a second diameter that is larger than said first diameter, forming a single shoulder on the exterior surface of said non-conductive separation sleeve and a single shoulder on the interior surface of said non-conductive separation sleeve;
wherein the innermost end of said non-conductive separation sleeve does not extend to the innermost end of said union;
wherein said non-conductive separation sleeve does not contact said sealing member; and
a non-conductive material positioned between said nut and said non-conductive separation sleeve.

10. The valve assembly of claim 9, wherein said external shoulder of said non-conductive separation sleeve contacts said internal shoulder of said nut, and said internal shoulder of said non-conductive separation sleeve contacts said external shoulder of said union.

11. The valve assembly of claim 9, wherein said valve body and said nut are made from a metallic material that includes brass.

12. The valve assembly of claim 9, wherein said first metallic material includes steel.

13. The valve assembly of claim 9, wherein said valve body is a unitary piece.

14. The valve assembly of claim 9, wherein said non-conductive separation sleeve is a thermoplastic material.

15. A piping system with a dielectric valve, comprising:
a unitary valve body having a fluid passageway between a fitting end and a union end of the valve body;
a valve member located in said fluid passageway;
a union, having an innermost end and an outermost end, made from a first metallic material;
a nut coupled to said union end of said valve body, said nut made from a second metallic material different from said first metallic material;
a sealing member positioned between said union and said union end of said valve body;
a non-conductive separation sleeve, having an innermost end and an outermost end, positioned in between said nut and said union, said separation sleeve preventing contact between said nut and said union, said separation sleeve including an upper section and a lower section that are connected by a generally perpendicular section;
a pipe coupled to said fitting end and a pipe coupled to said union;
wherein said non-conductive separation sleeve has an innermost section defined by a first generally cylindrical section and an innermost section defined by a second diameter that is larger than a first diameter, forming a single shoulder on the exterior surface of said non-conductive separation sleeve and a single shoulder on the interior surface of said non-conductive separation sleeve;
wherein the innermost end of said non-conductive separation sleeve does not extend to the innermost end of said union;

wherein said non-conductive separation sleeve does not contact said sealing member; and a non-conductive material positioned between said nut and said non-conductive separation sleeve.

16. The piping system with a dielectric valve of claim 15, wherein said non-conductive separation sleeve is made from a thermoplastic material.

17. The piping system with a dielectric valve of claim 15, wherein said first metallic material includes steel.

18. The piping system with a dielectric valve of claim 15, wherein said second metallic material includes brass.

19. The piping system with a dielectric valve of claim 15, wherein said pipe coupled to said union includes a steel material.

20. The piping system with a dielectric valve of claim 15, wherein said fitting end is a press-fit fitting.

\* \* \* \* \*